Jan. 29, 1963     E. B. JUDD ET AL     3,075,394
HERMETICALLY-SEALED TIMED ACTUATOR
Filed Nov. 23, 1960     2 Sheets-Sheet 1
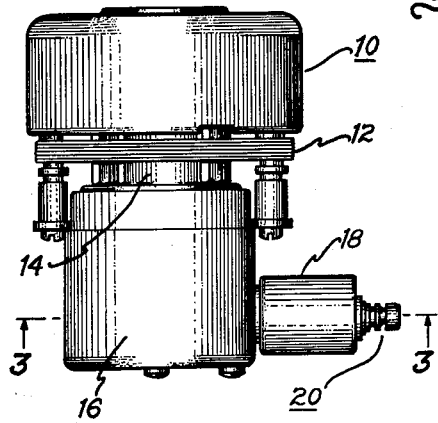
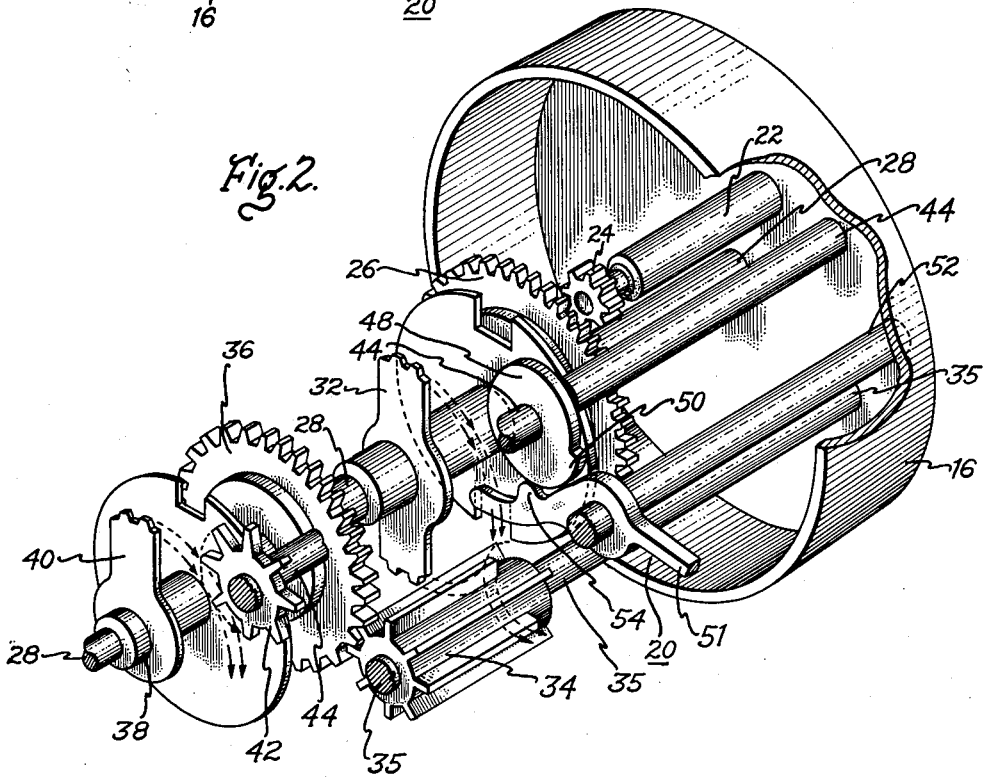
Inventors,
Edwin B. Judd,
Martin W. Hellar,
by Francis K. Doyle
Their Attorney.

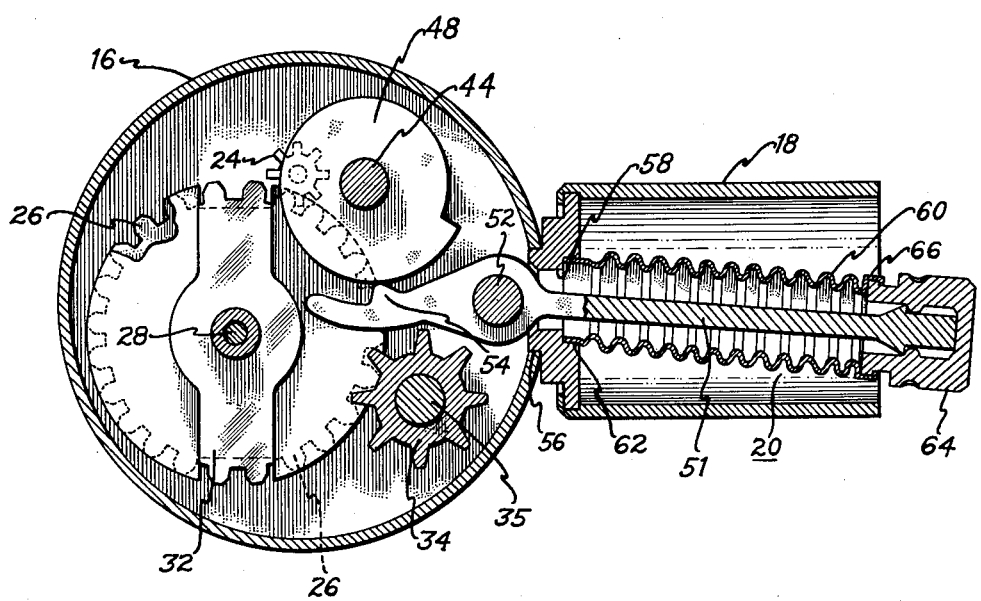

United States Patent Office 3,075,394
Patented Jan. 29, 1963

3,075,394
HERMETICALLY-SEALED TIMED ACTUATOR
Edwin B. Judd, Schenectady, N.Y., and Martin W. Hellar, Durham, N.H., assignors to General Electric Company, a corporation of New York
Filed Nov. 23, 1960, Ser. No. 71,266
3 Claims. (Cl. 74—18.1)

This invention relates to a timed actuator and more particularly to a hermetically sealed timed actuator which may be utilized as the timed actuator for a device which operates at pre-set intervals such as, for example, the automatic resetting of a demand register.

As is well known to those skilled in the art, the maintenance-free life of various mechanisms operating during a pre-set interval, such as, for example, automatic reset of demand registers, are usually limited to the life of the timing mechanism which is incorporated therein. As is well known, such timing mechanisms are usually in the form of a synchronous motor in which the rotor of the synchronous motor is utilized as the driving means for the timed actuator. In general, it has been found that the life of the motor is the limiting factor of the maintenance-free life of the timed actuator and therefore, is the significant factor in the maintenance-free life of the device which it is utilized to actuate. It has been found that the majority of failures of the synchronous motors utilized as timed actuators arise from one of two causes. The first cause is generally an oil leak in the motor by which the oil of the motor runs out of the terminal shaft bearing. This causes the motor to run dry and the terminal shaft to wear excessively, thus causing failure. The second general cause of failure is the oxidizing of the oil inside the rotor and timing mechanism. In this instance, air usually breathes through the terminal shaft bearing and oxidizes the oil. This oxidized oil does not provide sufficient lubrication for the motor rotor and the internal friction therefore increases until failure of the motor.

It has long been recognized in the timed actuator field that in order to increase the maintenance-free life of the devices on which the timed actuators are utilized that it is necessary to increase the life of the timed actuator. However, the main problem which arises in increasing the maintenance-free life of timed actuators is the necessity of completely sealing the actuator such that no air can get into the oil to oxidize it and such that the oil would be unable to leak out. However, in such sealing it has long been a problem as to a feasible method of actually sealing the timed actuator and still enabling the timed actuator to perform its necessary function of actuating the device to which it is attached. It has been discovered that by means of a novel hermetic seal that the timed actuator may be completely hermetically sealed such that the oil in the motor is unable to leak out and air is unable to get in and oxidize the motor and yet this novel seal enables the timed actuator to perform its desired function.

It is therefore an object of this invention to provide a timed actuator which is provided with a hermetical seal to prevent the leaking of oil or the oxidation of the oil within the actuator.

It is another object of this invention to provide a hermetically sealed timed actuator in which the actuator device though completely hermetically sealed is still able to adequately perform as an actuating mechanism.

In carrying out this invention in one form a hermetically sealed timed actuator is provided which comprises a synchronous timed motor including a stator and rotor, a drive shaft which forms part of the rotor of the motor, and a mechanism coupled to the drive shaft and having a member which cooperates with a pivotally mounted lever to provide an oscillating or translatory motion to the lever for a predetermined number of drive shaft rotations. The actuator is hermetically sealed by means of a casing which surrounds and encloses the rotor, drive shaft and coupled mechanisms and includes a flexible portion hermetically sealed to both the casing and the lever, the flexible portion surrounding the lever, and moving therewith.

The invention which is sought to be protected by this application is particularly pointed out and distinctly claimed in the claims appended hereto. However, it is believed that the objects of this invention, as well as other objects and advantages, will be more clearly understood by reference to the following description taken in connection with the accompanying drawings in which:

FIGURE 1 is a top view of a timed actuator hermetically sealed in accordance with this invention;

FIGURE 2 is an exploded view of the gearing mechanism of the timed actuator showing the connection of the timing lever with respect thereto; and FIGURE 3 is a view of a portion of the timed actuator taken substantially on the 3—3 of FIGURE 1.

Referring now to the drawings in which like numerals are used to indicate like parts throughout, and in particular with reference to FIGURE 1, there is shown a hermetically sealed timed actuator 10 made in accordance with one form of this invention. The timed actuator 10 comprises a stator portion or assembly 12, a sealed rotary portion or assembly 14, and a casing 16 which is hermetically sealed to the sealed rotor portion and includes the gearing mechanism of the timed actuator. A protective shield 18 is sealed to the casings 16. The protective shield 18 encloses the actuating device, generally indicated as 20. As will be understood by those skilled in the art, the timing actuator 10 operates so as to cause the actuating mechanism 20 to perform an oscillatory movement at a predetermined timed interval. For example, when the timed actuator 10 is utilized in a demand register, the timed interval for actuation of the device 20, which provides for automatic resetting of the register is generally 15 minutes, 30 minutes, or 60 minutes, depending upon the type of demand register. The timed movement of the actuator device 20 is obtained through a gearing mechanism or a Geneva mechanism such as, for example, the gearing mechanism which is disclosed in FIGURE 2 of the drawing.

Referring now to FIGURE 2 of the drawing, there is shown an exploded view of the gearing or Geneva mechanism utilized to obtain the desired timed actuation of the actuator device 20 from the continuous rotation of the synchronous motor, which is comprised of the stator 12 and the rotor 14. In FIGURE 2 a portion of the sealed casing 16 is shown. Extending through the end of the sealed casing 16 is the terminal shaft 22 of the motor rotor 14 and mounted on the end of such terminal shaft 22 is a spur gear 24. The spur gear 24 meshes with a gear 26 and, since the spur gear 24 is continuously rotated, it also continuously rotates the gear 26. The gear 26 is rotatably mounted on stub shaft 28 by means of the rotatable shaft bearing 30. As will be understood gear 26 is fixed to the rotatable shaft bearing 30 such that the rotation of the gear 26 also rotates the bearing 30. In a similar fashion, a transfer gear 32 is fixed on the rotatable shaft bearing 30, such that it rotates with the shaft bearing. Thus for every rotation of the gear 26 a comparable rotation will be provided to the transfer gear 32. Mounted within the casing 16 so as to mesh with the transfer gear 32 is a transfer pinion 34. Transfer pinion 34 is fixed on stub shaft 35, the shaft 35 being rotatably mounted in casing 16.

Transfer pinion 34 and transfer gear 32 are so designed that for every revolution of the transfer gear 32, it will engage the transfer pinion 34 twice and cause the transfer pinion 34 to rotate through a half cycle. The transfer pinion 34 is so mounted that it also engages with a second gear 36. The second gear 36 is fixed on a second rotatable shaft bearing 38, the bearing 38 also being rotatably mounted on the stub shaft 28. Mounted on the same shaft bearing 38 as the gear 36 is a second transfer gear 40, the transfer gear 40 thus rotating at the same speed as the gear 36. Also rotatably mounted in the casing 16 is a second transfer pinion 42, the transfer pinion 42 being mounted so as to mesh with the transfer gear 40 once during each rotation of the transfer gear. Gear 40 and pinion 42 are designed to obtain one rotation of pinion 42 for a predetermined number of rotations of gear 40. In the example shown in the drawing, for every rotation of the transfer gear 40, the transfer pinion 42 will be rotated through a 90° portion of its entire cycle. In other words, the transfer pinion 42 is rotated once for every four rotations of the transfer gear 40. By means of proper selection of the gears, 26 and 36 the transfer gears 32 and 40, and the transfer pinions, 34 and 42 the transfer pinion 42 may be rotated one complete cycle for the desired predetermined interval. For example, in considering a demand register, one complete cycle may be fifteen minutes.

As before noted, the transfer gear 42 is rotatably mounted within the casing 16, such as, for example, by being fixed to the rotatably mounted stub shaft 44. Fixedly mounted on the rotating stub shaft 44 is a cam member 48 provided with the cam section 50. The mounting is such, that for every rotation of the transfer pinion 42, the cam device 48 also makes one complete revolution. In order to provide the desired timed actuation, the actuator device 20 comprises a lever or arm 51 which is pivotally mounted within the casings 16 as for example, by being pivotally mounted to a stub shaft 52. The actuator arm or lever 51 is provided with a cam follower 54 and is pivotally mounted such that the cam follower 54 is maintained in constant contact with the cam 48. As the cam 48 completes a single revolution, the cam portion 50 contacts the cam follower 54 of lever 51 forcing the front end of the lever 51 in a downward direction thereby causing the other end of the lever 51 to be forced in an upward direction as viewed from FIGURE 2. From the above it can be seen that through the action of the gearing mechanism connected to the terminal gear 24 of the synchronous motor an oscillatory motion of the lever 51 is obtained at a predetermined interval. The example set forth before was an interval of 15 minutes. Thus, the cam portion 50 of cam 48 will engage cam follower 54 of lever 51, once every 15 minutes causing the outer end of lever 51 to oscillate in an upward direction as viewed in FIGURE 2.

In order to provide the desired sealing of the entire mechanism a novel sealing device is utilized. Referring now to FIGURE 3 of the drawing, wherein there is shown the outer casing 16 which seals the mechanism for providing the timed movement of the actuator device 20, it is seen that the casing 16 is provided with an aperture 56 through which the outer end of the lever 51 protrudes. In order to provide the desired sealing of the lever 51 and still enable the desired actuation of lever 51, a guard member 18, which is in the shape of an open ended cup, is provided. Guard member 18 has an aperture 58, and the cup 18 is so mounted on the casing 16 such that the aperture 56 of casing 16 and the aperture 58 of cup or guard 18 are aligned. The portion of the guard 18 surrounding the aperture 58 is hermetically sealed to the casing 16 surrounding the aperture 56. A flexible member 60 is then mounted over the arm 51 and is hermetically sealed to the bottom portion of the guard 18 as indicated at 62, thereby providing a hermetic seal between the casing, the guard, and the flexible member 60.

The outer portion of the flexible member 60, which may be, for example, a metallic bellows, is hermetically sealed to a cap-portion 64 which surrounds and encloses the outer end of the lever 51. The cap-member 64 and the flexible member 60 are hermetically sealed together as indicated at 66. Thus, it can be seen that the desired actuation of the actuator device 20 may be obtained through the operation of the gearing mechanism which drives the cam 48. Also, it can be seen that due to the unique sealing method, that the lever 51 is enabled to be actuated as desired, while preventing any oil from leaking out from the interior of the casing 16 and similarly preventing the entry of any air into casing 16. By means of the unique hermetically sealed, timed actuator herein set forth, the maintenance-free life of the actuator is substantially increased by preventing any leaking of the oil as well as any entry of air which would oxidize the oil. Thus, it can be seen that there is provided a novel hermetically sealed, timed actuator which will perform the desired actuating function and still provides a hermetic seal of the actuating mechanism to prevent the loss of oil or the oxidation of oil therein and thus to substantially increase the maintenance-free life of the actuating device.

While there has been shown and described the present preferred embodiment of the invention as required by the patent statutes, it will be obvious to those skilled in the art that various changes may be made in the operations and connections of the device described without departing from the spirit and scope of the invention as set forth in the appended claims.

What we claim as new and desire to secure by Letters Patent of the United States is:

1. An hermetically sealed timed actuator comprising: an hermetically sealed casing, an elongated arm having one end within said casing and the other end extending outwardly from said casing, an opening in said casing through which said arm extends, means within said casing pivotally mounting said arm near said one end thereof, said other end of said arm normally being in a lowermost position, timing means in said casing contacting said one end of said arm to move said other end of said arm to an uppermost position at the end of a predetermined interval, and an elongated, hollow, flexible member having one end hermetically sealed to said casing about said opening therein, and the other end hermetically sealed to said other end of said arm, said outwardly extending portion of said arm being enclosed in said flexible member.

2. An hermetically sealed timed actuator as claimed in claim 1 in which said flexible member is a metallic bellows.

3. The invention defined by claim 2 in which an open ended cup is mounted on said casing, the cup having mounted centrally of its base one end of said elongated bellows, said casing and said base having aligned apertures which open into the interior of said bellows such that the said elongated arm can extend from within said casing into and along said bellows, said base of said cup being hermetically sealed to said casing and said one end of said bellows being hermetically sealed to the said base of said cup, the side walls of said cup being spaced from said bellows to serve as a protective shield therefor.

References Cited in the file of this patent

UNITED STATES PATENTS

| | | |
|---|---|---|
| 1,624,736 | Hutt | Apr. 12, 1927 |
| 2,221,942 | Carlson | Nov. 19, 1940 |
| 2,299,179 | Rosenberger | Oct. 20, 1942 |
| 2,335,787 | Panissidi | Nov. 30, 1943 |
| 2,449,852 | Jones | Sept. 21, 1948 |
| 2,917,939 | Harris | Dec. 22, 1959 |